United States Patent [19]

Kell

[11] 4,127,240
[45] Nov. 28, 1978

[54] ACCELERATION-SENSING MECHANISM

[75] Inventor: John Kell, Sherman Oaks, Calif.

[73] Assignee: Kangol Magnet Limited, London, England

[21] Appl. No.: 739,992

[22] Filed: Nov. 8, 1976

[51] Int. Cl.² .................. B65H 75/48; A62B 35/02
[52] U.S. Cl. .................................... 242/107.4 A
[58] Field of Search ........................ 242/107.4 A; 280/744–747; 297/388

[56] References Cited

U.S. PATENT DOCUMENTS

| 3,578,260 | 5/1971 | Kell | 242/107.4 A |
| 3,938,755 | 2/1976 | Stephenson et al. | 242/107.4 A |
| 3,944,162 | 3/1976 | Henderson | 242/107.4 A |
| 3,963,193 | 6/1976 | Higbee et al. | 242/107.4 A |
| 4,053,117 | 10/1977 | Takada | 242/107.4 A |

Primary Examiner—Peter Feldman
Assistant Examiner—John M. Jillions
Attorney, Agent, or Firm—Young & Thompson

[57] ABSTRACT

The inertia-actuated acceleration-sensing mechanism for an inertia reel for a vehicle safety belt comprises a pendulum that includes a circular plate that is mounted on a tubular support member for tilting movement at the edge of the plate. The mechanism also comprises an output member that is slidable on the tubular member in response to tilting of the plate, to provide a mechanical output of the mechanism. The tilting movement is arranged to take place about any position on a circle around a vertical line through the normal position of the center of gravity of the pendulum, the circle being centered on the vertical through the normal position of the center of gravity of the pendulum. When fitted to an inertia reel, the mechanical output of the mechanism is arranged to lock the reel against rotation.

3 Claims, 2 Drawing Figures

ACCELERATION-SENSING MECHANISM

The invention relates to an inertia-actuated acceleration-sensing mechanism and to an inertia reel device incorporating such a mechanism.

In some applications inertia-actuated acceleration-sensing mechanisms are required not to operate below a certain threshold acceleration, without however failing to operate in response to greater accelerations. For example, such mechanism in an inertia reel for a vehicle safety belt may be required to be ineffective to lock the reel against belt withdrawal under low accelerations for example 0.3 G such as may be experienced in conditions of safety. (It will be understood that the term "acceleration" as used herein is intended to cover negative acceleration, that is, deceleration, as well as positive acceleration.) The mechanism is required on the other hand to operate to lock the reel without fail under a greater acceleration for example an acceleration of 0.7 G or more.

The invention accordingly provides an inertia-actuated acceleration-sensing mechanism comprising a pendulum pendulously supported in the position of use by a support for tilting movement about a position horizontally spaced from the normal position of the centre of gravity of the pendulum, and an output member guided by the support for movement in response to tilting of the pendulum to provide a mechanical output of the mechanism.

Preferably, the support is a tubular member which supports the pendulum on an internally projecting lip or flange and which additionally guides the output member for axial sliding movement. This construction is particularly compact.

The mechanism is advantageously mounted as in a seat belt reel device for adjustment relative to the device. For this purpose, the support may be provided with an integral mounting portion for example a ball-shaped portion for reception of a cooperating mounting socket on the reel device.

By way of illustration, an inertia reel device incorporating an inertia actuated acceleration sensing mechanism in accordance with the invention is described below with reference to the accompanying drawings, in which.

Figure 1:
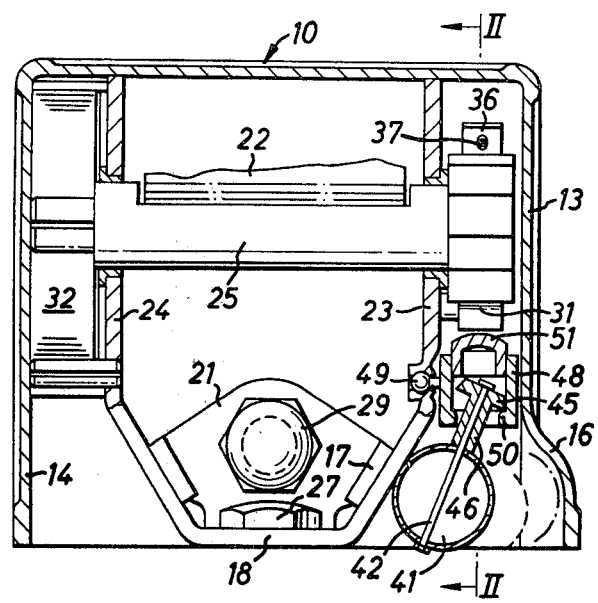
FIG. 1 is a vertical sectional view through the device.

The illustrated inertia reel device comprises a main housing 10 having upright side walls 11, 12, upright end walls 13, 14 and a semicylindrical top wall 15.

Within the housing 10, a sub-housing 17 provides support portions 18 and 21 provided with mounting holes by which the device may be secured within a vehicle, as by a bolt 27 to a horizontal mounting surface, or by a bolt 29 to a vertical surface. The sub-housing 17 also provides internal side webs 23, 24 extending parallel to the main housing walls 13, 14 and journalling a spindle 25. One end of a seat belt 22, which extends into the housing 10 through a slot 19 in the wall 15, is secured to the spindle 25 in a conventional way. Between the side web 24 and the end wall 14, a re-wind spring 32 acts between the housing in the spindle to apply to the latter a force tending to rotate it in the direction to wind the belt 22 into the housing.

At its opposite end, the spindle carries between the end wall 13 and the side web 23 a ratchet wheel 30 which is associated with a locking pawl 31 mounted on a shaft 32 to form a locking means for the device. The pawl 31 has a nose 34 which can be pivoted into the path of movement of gear teeth 35 on the ratchet wheel 30. In the normal position of the pawl, the nose 34 is below the path of movement of the teeth 35. A leaf spring 36 secured by a screw 37 to the inside of the housing 10 acts on the pawl 31 to tend to maintain this in its normal position, shown in FIG. 2.

Beneath the locking means, there is accommodated between the end wall 13 and the side web 23 an inertia actuated acceleration sensing mechanism having a pendulum assembly comprising a generally spherical bob weight 41 of lead or other metal secured by a rivet 42 to a suspension member 44 consisting of a centrally apertured circular plate 45 and a tubular portion 46. The plate 45 has its edge tapered upwardly so that the diameter of the lower face exceeds that of the top face. The tubular portion 46 extends downwardly from the lower face of the plate around the central aperture and the rivet 42 extends through this aperture and the tubular portion which thus determines the spacing of the weight 41 from the lower face of the plate 45.

Figure 2:
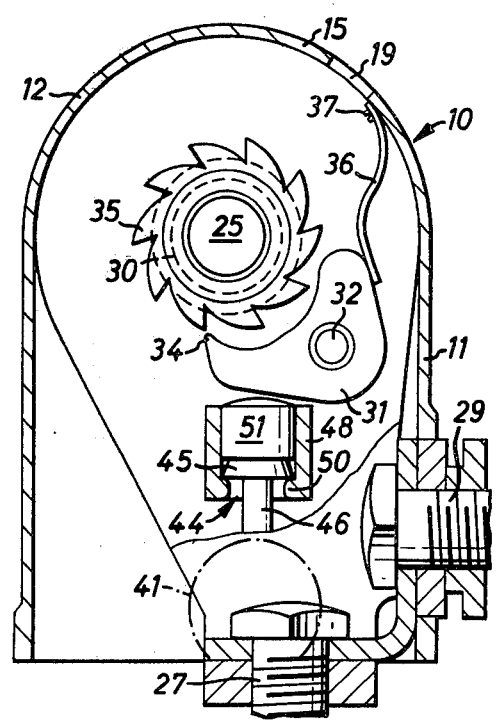
FIG. 2 is an end elevation of the device taken on the line II—II of FIG. 1.

The pendulum assembly is mounted in a tubular support 48 having an integral support projection 49 received within an aperture in the side web 23. The support 48 has an integral radially inwardly extending convex peripheral annular lip 50 around its lower end and the lower edge of the plate 45 normally rests on the lip in substantially line contact only, in the circular corner where this joins the inner surface of the support. An output member or plunger 51 is slidably received in the support 8. The plunger 51 is tubular in form and has an open lower end engaging the upper face of the plate 45 and a closed upper end which is domed and normally slightly protrudes above the upper end of the support. FIG. 2 shows the neutral or inoperative position of the mechanism in which the domed top of the plunger 51 is spaced slightly below the underside of the pawl 31. The pawl 31 may instead rest directly on the domed top of the plunger.

FIG. 1 shows the position the mechanism assumes under a considerable acceleration. The pendulum assembly has pivoted about the edge of the lower face of the plate 45, this pivotal movement within the support 48 being rendered possible by the tapered edge of the plate 45. The diametrically opposed part of the upper face has consequently risen to cause the plunger 51 to slide upwardly in the support 48. The pawl 31 has been pivoted by this movement of the plunger 10 from its normal position, thereby pivoting the pawl 31 on the shaft 32 to bring the nose 34 into position for engagement with the ratchet teeth 35. The experiencing by the vehicle of an acceleration sufficient to move the pendulum to the FIG. 1 position will normally be accompanied by a pull on the belt 22 so that full locking engagement between the nose 34 and the ratchet wheel teeth takes place.

The threshold acceleration below which the mechanism will not act depends on the mass of the weight 1, the radius of the lower face of the plate 5 and the distance below this face of the centre of gravity of the assembly. The threshold can thus be readily selected by appropriate choice of these factors.

It is advantageous to arrange for adjustment of the position of the mechanism within the reel device, so that in the rest position the plate 45 engages the lip 50 around its entire periphery. The support projection 49 is therefore constituted a ball which is received in a cooperating socket portion of the side web 23. Preferably this adjustable mounting connection can be clamped when the desired location of the mechanism has been reached.

The illustrated embodiment is responsive to accelerations in any horizontal direction but it will be evident that it can be readily modified to be responsive to accelerations in one or more selected directions only, or to be responsive to predetermined threshold levels which are different from the levels effective in other directions. Thus the centre of gravity of the pendulum need not be centred within the circle on which the pendulum can pivot. Moreover, the pendulum need not be supported for tilting about points on a circle but the plate engaging the support could be square or rectangular so that tilting occurs about the edges. Again the centre of gravity need not be central.

It will thus be understood that the invention can be embodied in other ways than specifically described whilst still providing an advantageous inertia-activated acceleration-sensing mechanism which will respond only to accelerations above a predetermined level and which is suited but not confined to vehicle safety applications, in particular, safety belt reels such as specifically described.

I claim:
1. A vehicle safety belt retractor, said retractor comprising
    (1) (a) a reel,
    (b) a vehicle safety belt having an end thereof secured to said reel, and
    (c) a rewind spring adapted to rotate said reel so as to wind said safety belt thereon,
    (2) a locking mechanism operable to prevent rotation of said reel in a direction to unwind said belt therefrom, said locking mechanism comprising
        (a) a ratchet wheel, and
        (b) a pawl pivotably mounted for movement from a rest position wherein said pawl is disengaged from said ratchet wheel, to a locking position wherein said pawl engages said ratchet wheel to thereby operate said locking mechanism to prevent rotation of said reel in said unwinding direction, and
    (3) an inertia sensing device operatively associated with said locking mechanism, said inertia sensing device comprising
        (a) a tubular guide means having a cylindrical inner wall
        (b) means mounting said tubular guide means in said retractor with the guide means axis substantially vertical
        (c) lip means extending inwardly at the lower end of said tubular guide means, said lip means comprising a radially inwardly extending convex lip that joins the lower end of said cylindrical wall to form a circular corner
        (d) pendulum means comprising a disc means and a pendulum weight fixedly suspended from said disc means, said disc means resting on said lip means in said circular corner in substantially line contact only, said disc means tapering inwardly from a lower peripheral edge to an upper surface with said lower peripheral edge being in centering relationship with said tubular guide means inner cylindrical wall,
        (e) an output member resting on said disc means upper surface, said output member having a cylindrical outer surface in sliding relationship with said tubular guide means inner surface and an upper surface juxtaposed to said locking mechanism pawl, whereby an acceleration exceeding a predetermined amount causes said pendulum means to tilt about the disc means lower peripheral edge, said disc means upper surface causes upward movement of said output member, and said output member upper surface causes said locking mechanism pawl to pivot from the rest position to the locking position thereof.

2. The retractor of claim 1 wherein said means mounting said tubular guide means is a support projection constituted by a ball carried by said tubular guide means and received in a cooperating socket portion in said retractor.

3. The retractor of claim 1 wherein the underside of said disc means is flat.

* * * * *